T. H. WORRALL.
Centering Chuck.

No. 46,747.

Patented March 7, 1865.

Witnesses:

Inventor
Thomas H Worrall

UNITED STATES PATENT OFFICE.

THOMAS H. WORRALL, OF MANCHESTER, NEW HAMPSHIRE.

IMPROVED SELF-CENTERING CHUCK.

Specification forming part of Letters Patent No. 46,747, dated March 7, 1865.

*To all whom it may concern:*

Be it known that I, THOMAS H. WORRALL, of Manchester, in the county of Hillsborough and State of New Hampshire, have invented a new and Improved Self-Centering Chuck; and I do hereby declare that the following is a full, clear, and exact description thereof, which will enable others skilled in art to make and use the same, reference being had to the accompanying drawings, forming part of this specification, in which—

Figure 1:
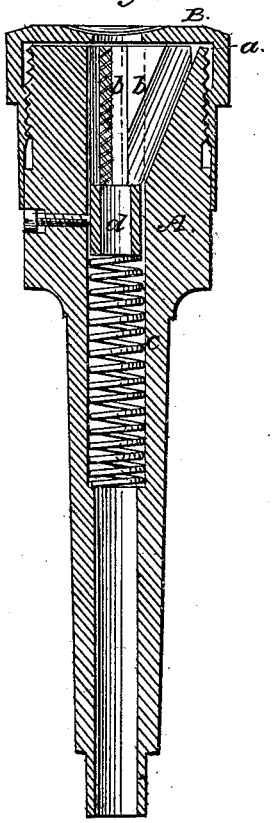
Figure 2:
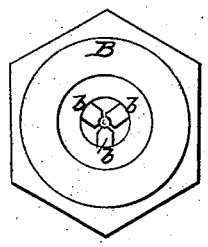
Figure 3:
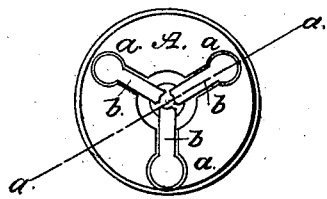

Figure 1 is a longitudinal central section of this invention, taken in the plane indicated by the line $x\ x$, Fig. 3. Fig. 2 is a front view of the same. Fig. 3 is a similar view of the same, the cap being removed to expose the interior of the chuck.

Similar letters of reference indicate like parts.

This invention consists in the employment of wedge shaped jaws fitted into the head of the chuck and acted upon by a spring which has a tendency to force said jaws out, in combination with inclined diverging ways and with a screw-cap, in such a manner that by unscrewing the cap the jaws will open, and by screwing the cap down the jaws close concentrically, and a rod or tool placed between them is centered without loss of time.

In order to prevent the jaws from dropping out of their ways, their outer edges are spread or expanded and fitted in corresponding cavities at the outer ends of their ways.

A represents the head of my chuck, which may be made of cast-iron or any other suitable material and of any convenient size. When small it may be cast solid with a tapering shank turned off so as to fit in the lathe-spindle, but if large said chuck must be made with a screw-thread to screw on the end of the spindle like the face-plate. The outer end of the head A is provided with three (more or less) cavities, $a$, the outer edges of which form inclined planes, as clearly shown in Fig. 1 of the drawings. These cavities form the ways for the jaws $b$, which are wedge-shaped, so that when their outer edges bear on the inclined planes of the ways their inner edges are parallel with and equidistant from the center line of the chuck.

To prevent the jaws from dropping out of the ways, their rear or outer edges are spread or enlarged and fitted in correspondingly enlarged cavities at the outer ends of the ways $a$, as clearly shown in Fig. 3.

A cap, B, which screws on the head A, serves to force the jaws in, and as the same moves down on the inclined planes or ways $a$, they close up, keeping their inner edges always equidistant from the center line of the chuck.

A spiral spring, $c$, which is concealed in the interior of the chuck, presses on a tubular slide, $d$, which bears against the inner ends of the jaws $b$. By the action of this spring the jaws are forced out against the inner surface of the cap, and if the cap is unscrewed said jaws open to admit a tool or other article between them.

In order to be able to unscrew the cap and to remove the jaw, it is necessary to screw the cap down first as far as it will go, and then the slide $d$ is rendered rigid by the set-screw $e$, which passes laterally through the head A. The action of the spring on the jaws is thereby interrupted, and the cap can be unscrewed and the jaws removed without difficulty. After the jaws and the cap are replaced, the set-screw must be unscrewed to release the slide $d$ and to put the chuck in working order.

This chuck can be used in screw-machines to hold the stock from which the screws are made, also in ratchet-drills and bit-stocks to hold the drills or other tools, and in fact everywhere where the use of a self-centering chuck may be desirable or of advantage. Its operation is very simple; it is not liable to get out of order, and it can be made and sold for a reasonable price.

I claim as new and desire to secure by Letters Patent—

The wedge-shaped jaws $b$ and corresponding ways, $a$, in combination with the spring slide $d$ and cap B, constructed and operating substantially as and for the purpose set forth.

THOMAS H. WORRALL.

Witnesses:
  GEO. H. GERRY,
  JOSEPH D. HALL.